United States Patent [19]

LaMarca

[11] Patent Number: 5,294,089
[45] Date of Patent: Mar. 15, 1994

[54] PROPORTIONAL FLOW VALVE

[75] Inventor: Drew P. LaMarca, Whippany, N.J.

[73] Assignee: Automatic Switch Company, Florham Park, N.J.

[21] Appl. No.: 923,818

[22] Filed: Aug. 3, 1992

[51] Int. Cl.⁵ ............................................. F16K 31/122
[52] U.S. Cl. ...................................... 251/30.02; 251/39
[58] Field of Search ............... 251/30.01, 30.02, 30.03, 251/30.04, 30.05, 129.01, 129.08, 39

[56] References Cited

U.S. PATENT DOCUMENTS

| | | | |
|---|---|---|---|
| 2,554,158 | 5/1951 | Spence | 251/39 X |
| 4,921,208 | 5/1990 | LaMarca | 251/30.04 |

FOREIGN PATENT DOCUMENTS 616361 2/1961 Italy ..................................... 251/39

*Primary Examiner*—Gerald A. Michalsky
*Assistant Examiner*—Kevin L. Lee
*Attorney, Agent, or Firm*—Alan H. Levine; Howard F. Mandelbaum

[57] ABSTRACT

A proportional flow valve wherein inlet fluid pressure urges the valve member toward the valve seat. A pressure member, which may be a piston, has an effective area substantially larger than that of the valve member, and is also selectively subjected to inlet fluid pressure to urge the valve member away from the valve seat, so as to open the valve and keep it open. A solenoid actuator determines the position of a pilot valve member which controls the flow of inlet fluid to the pressure member, and hence controls the location of the pressure member and the spacing of the valve member from the valve seat. The position of the pilot valve member, and hence the spacing of the valve member from the valve seat, is proportional to the amount of electric current applied to the actuator.

10 Claims, 3 Drawing Sheets

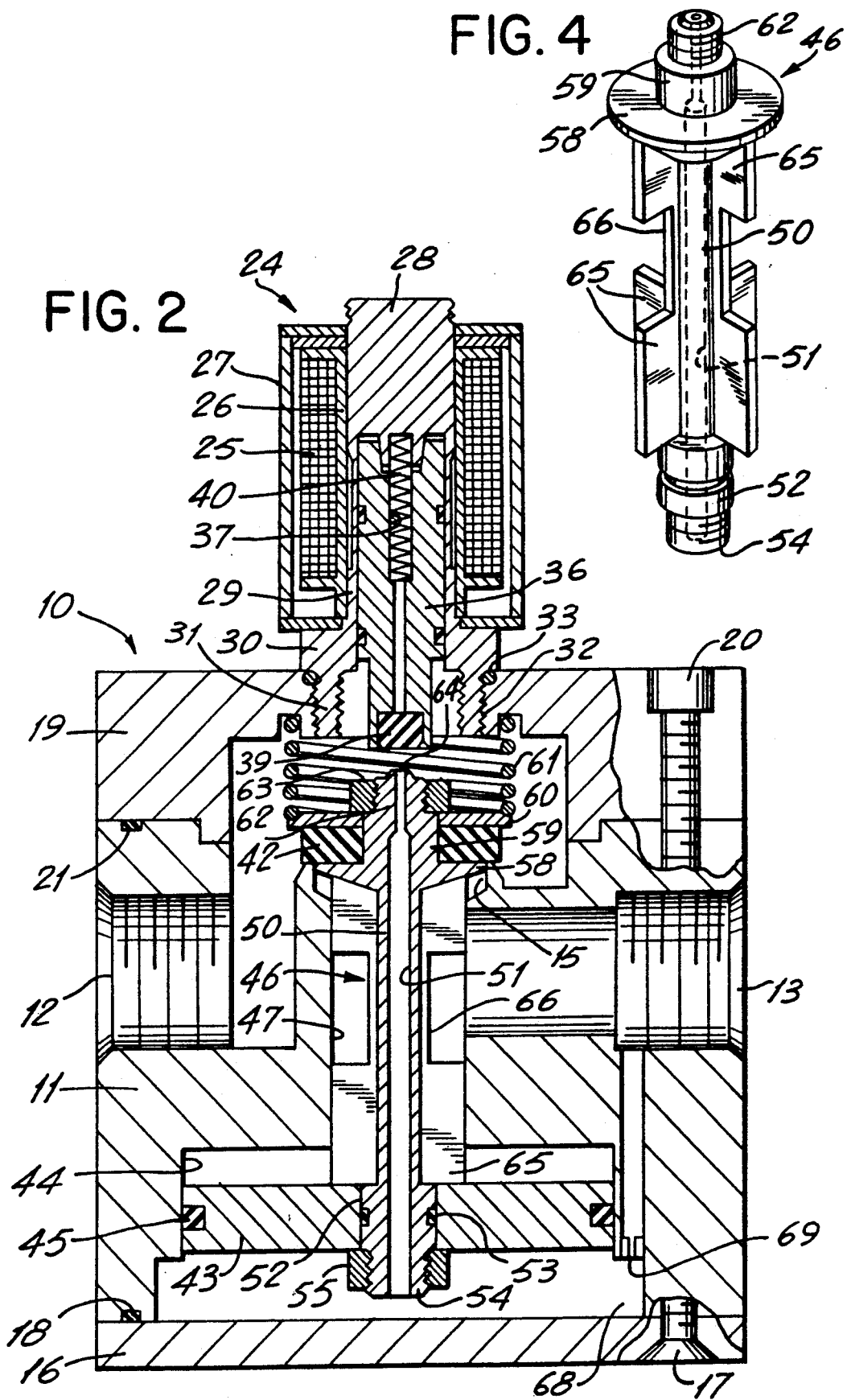

PROPORTIONAL FLOW VALVE

This invention relates to a valve operated by an electrical solenoid actuator, and more particularly to a proportional flow valve of this type.

Such a valve is shown in U.S. Pat. No. 4,921,208. This valve permits a rate of fluid flow through the valve proportional to the amount of electric current applied to the solenoid of the actuator controlling the valve. In this type of arrangement, the actuator behaves in a linear manner, i.e., the force produced by the solenoid armature is linearly proportional to the current applied to the solenoid. As a result, the solenoid armature works in linear manner against the closing spring which constantly urges the valve member toward the valve seat. In this way, the distance which the valve member is moved away from the valve seat is proportional to the amount of current applied to the solenoid.

Proportional flow valves find utility in performing mixing and measurement functions. For example, proportional valves are used to accurately blend different gasolines to achieve desired characteristics, such as particular octane ratings, and to mix hot and cold water to obtain a desired temperature. Also, a proportional valve may be used when it is desired to have a valve open gradually so that the flow of the controlled fluid, such as hot water, begins slowly, so as to prevent scalding, after which the valve may be fully opened.

Typically, the power applied to the solenoid actuator is a rapidly pulsed DC current, the amount of current varying with the length of "on" and "off" times of the pulses (sometimes referred to as pulse width modulation).

The valve of the above-mentioned U.S. Pat. No. 4,921,208 has been found to admirably perform its intended function. However, the valve does present a couple of problems. First, it comprises a relatively large number of parts, which make it relatively expensive to manufacture and assemble, as well as increasing inventory costs. In addition, when handling fluid pressures in certain pressure ranges, the valve has been found somewhat difficult to open.

It is therefore an object of the present invention to provide a proportional flow valve having all the advantages offered by the valve of U.S. Pat. No. 4,921,208, but which comprises many fewer parts, i.e., less than one half the number of parts of the earlier valve. As a result, the valve of the present invention is far less costly to produce, since the cost of parts and the assembly time are both significantly reduced. Also, the cost of inventorying parts is reduced.

It is another object of the invention to provide a valve of the type described above which operates reliably throughout all fluid pressure ranges.

Both the valve of the above-identified patent and the valve of the present invention employ a solenoid actuator including an armature whose position is determined by the amount of electric current applied to the solenoid of the armature. Both valves also employ a pressure member which when pressurized by fluid from the inlet port of the valve counterbalances the force of the inlet fluid pressure on the main valve member. However, the two valves operate on different principles.

In the valve of U.S. Pat. No. 4,921,208, the pressure member serves only to balance the force on the main valve member, and movement of the solenoid armature is directly transmitted to the main valve member so that the position of the armature directly prescribes the position of the main valve member. In contrast, in the present invention, the pressure member has a larger effective area than the main valve member, so that when the pressure member is subjected to inlet fluid pressure, the pressure member tends to move the main valve member away from the main valve seat to open the valve, and keep it open. A pilot valve includes a pilot valve member carried by the solenoid armature and a pilot valve seat fixed to and moveable with the main valve member and the pressure member. The pilot valve controls the flow of inlet fluid pressure to the pressure member. As a result, the position of the armature indirectly controls the position of the pressure member and main valve member by controlling the flow of inlet fluid pressure to the pressure member. A bleed hole continuously bleeds pressurized fluid from the pressurized face of the pressure member so as to keep the pressure member sensitive to the control of inlet fl id pressure by the pilot valve.

Other features and advantages of the invention will be apparent from the following description, in which reference is made to the accompanying drawings.

In the drawings:

FIG. 2 is a view similar to FIG. 1, showing the solenoid energized and pilot valve open, but just prior to opening of the main valve;

FIG. 4 is a perspective view of the interconnecting member which joins the main valve member and the pressure member.

Figure 1:
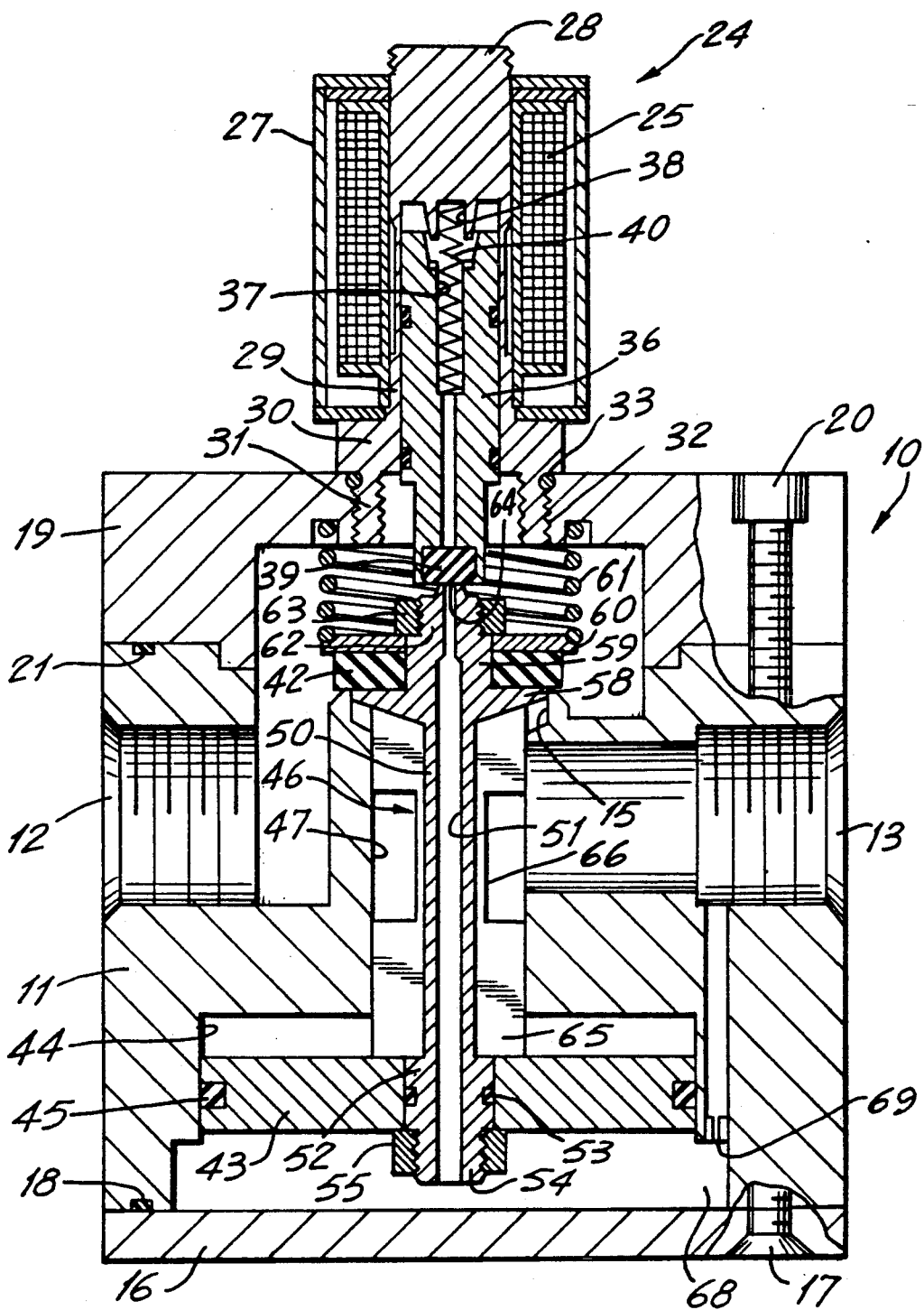
FIG. 1 is a cross-sectional view of a proportional flow valve according to the present invention, the solenoid actuator being deenergized and the valve closed.

Referring to FIG. 1, the proportional flow valve 10 chosen to illustrate the present invention includes a valve body 11 having a fluid inlet port 12, a fluid outlet port 13, and main valve seat 14 (FIGS. 3 and 5) between those ports surrounding a main orifice 15. A lower plate 16 is secured to valve body 11 by suitable fasteners 17 (only one being shown), a seal 18 insuring a fluid-tight connection between the lower plate and valve body. A bonnet plate 19 is secured to the top of the valve body 11 by suitable fasteners 20 (only one being shown), a seal 21 insuring a fluid-tight connection between the bonnet plate and valve body.

Surmounting bonnet plate 19 is a solenoid actuator 24. The actuator includes a coil of electrically conductive wire 25 wound upon a spool 26 made of non-electrically and non-magnetically conductive material. Suitable terminals (not shown) are provided for connection to a source of electric current for energizing the coil. A housing 27, of magnetic material, surrounds the coil.

A stationary armature, or plugnut, 28 is located within the upper portion of spool 26. A core tube 29 depends from the plugnut and extends through the remainder of the spool. At its lower end, core tube 29 is formed with an enlarged diameter nut-like collar 30 from which an externally threaded nipple 31 projects downwardly. Nipple 31 is threaded into an internally threaded bore 32 in bonnet plate 19, a seal 33 insuring a fluid-tight connection between collar 30 and bonnet plate 19.

Slidable axially within core tube 29 is a moveable armature 36 of magnetic material. Armature 36 is formed with an axial bore 37, and plugnut 28 is formed with a corresponding bore 38. A compression spring 40, seated within bores 37 and 38, constantly urges moveable armature 36 downwardly away from plug nut 28. The upper face of moveable armature 36 and the lower face of plugnut 28 are correspondingly profiled so that the two faces mesh as the moveable armature moves upwardly toward the plugnut. At its lower end, armature 36 carries a pilot valve member 39 formed of resilient material.

Within valve body 11 is a main valve member 42, of resilient material, moveable toward and away from main valve seat 14 to close and open the valve respectively. Also located within the valve body is a pressure member in the form of a rigid piston 43 slidable axially within a cylindrical cavity 44 formed in the valve body. A seal 45 provides fluid-tight sliding engagement between the periphery of piston 43 and the wall of cavity 44.

Main valve member 42 and piston 43 are rigidly joined together, as a unit, by an interconnecting member 46, shown more clearly in FIG. 4. Member 46 is slidable axially within a bore 47 in valve body 11, the bore being an extension of orifice 15, and forming part of the flow path for fluid from inlet port 12 through orifice 15 and bore 47 to outlet 13.

Interconnecting member 46 comprises a central tubular portion 50 containing an axial central passageway 51 which extends for the full length of the member. Near its lower end, member 46 present a hub 52 for supporting piston 43, a seal 53 providing fluid-tight engagement between piston 43 and hub 52. Projecting from hub 52 is an externally threaded boss 54 which accommodates a nut 55 for retaining piston 43 on member 46.

Near its upper end, member 46 is formed with a flange 58 and hub 59 for supporting main valve member 42. Hub 59 also carries a retaining washer 60 which helps to support main valve member 42. One end of a compression spring 61 is seated against retaining washer 60, and the other end is seated within an annular groove formed in bonnet plate 19. Spring 61 constantly urges main valve member 42 toward main valve seat 14 tending to close the valve. An externally threaded boss 62 projects upwardly from hub 59, and a nut 63 cooperates with the boss to secure main valve member 42 and retaining washer 60 on member 46. The upper face of boss 62 is attenuated to define a pilot valve seat 64 (see FIG. 2) cooperable with pilot valve member 39.

Between hub 52 and flange 58, tubular portion 50 of interconnecting member 46 is formed with a plurality, in this example four, radially extending vanes 65. The outer edges of vanes 65 slidably engage the wall of bore 47 to guide the axial movement of interconnecting member 46, and hence main valve member 42 and piston 43. While vanes 65 serve their guiding function, they do not interfere with the flow of fluid from orifice 15 to outlet port 13. Since the fluid flowing through orifice 15 can sometimes be somewhat turbulent, there is a tendency for this fluid flow to act on vanes 65 causing member 46 to rotate about its axis. To minimize this "paddle wheel" effect, each vane 65 is formed with a cut-out region 66.

To further add to the stability of the valve, and control of the fluid flowing through it, the orifice 15 (see FIG. 5) has substantially the same diameter as valve seat 14 for only a short axial distance. The orifice is then reduced in diameter, in a transition region 67, to the smaller diameter of bore 47. This profiling has the effect of moving the region of fluid turbulence from the valve seat 14 to the transition region 67, i.e., the region of pressure differential is moved away from valve seat.14.

Piston 43 and lower plate 16 define, between them, a chamber 68 into which high pressure fluid flows when the valve is open. A bleed hole 69 provides constant communication between chamber 68 and outlet port 13. The largest cross-sectional flow area of bleed hole 69 is smaller than the smallest cross-sectional flow area of passageway 51.

When solenoid coil 25 is deenergized and the valve is connected to a source of pressurized fluid, the force of the fluid on main valve member 42, combined with the force of spring 61, hold main valve member 42 against main valve seat 14 to close the valve. When coil 25 is energized by an electrical current, armature 36 is attracted to plug nut 28, and hence moves upwardly against the force of spring 40 (see FIG. 2). As armature 36 rises, it moves pilot valve member 39 away from pilot valve seat 64, thereby permitting inlet fluid to flow through passageway 51 into chamber 68, so that the lower face of piston 43 is pressurized. Since piston 43 is substantially larger than valve member 42, the resultant force of inlet fluid pressure on both piston 43 and main valve member 42 is a net upward force on the unit comprising piston 43, valve member 42, and interconnecting member 46. In consequence, that unit rises and main valve member 42 moves away from main valve seat 14 (see FIG. 3) thereby opening the main valve and permitting fluid flow from inlet port 12 to outlet port 13.

The unit 42, 43, 46 continues to rise until pilot valve seat 64 engages pilot valve member 39, i.e., the pilot valve is closed. As a result, high pressure fluid no longer can flow through passageway 51 to chamber 68.

At the same time, the fluid pressure in chamber 68 is relieved since fluid constantly flows from that chamber through bleed hole 69 to outlet port 13. Once the pressure in chamber diminishes sufficiently, the high pressure fluid acting on valve member 42 produces a force sufficient to move the unit 42, 43, 46 downwardly. As soon as this downward movement is initiated, pilot valve 39, 64 opens once again permitting flow of high pressure fluid to chamber 68. An equilibrium position is quickly established in which unit 42, 43, 46 constantly oscillates through a very short distance as pilot valve 39, 64 is repeatedly opened and closed. The location of the unit as it oscillates is determined by the position of armature 36, and hence pilot valve member 39. This position also determines the spacing between main valve member 42 and main valve seat 14, and hence determines the amount of fluid flow through the valve.

Figures 3, 5:
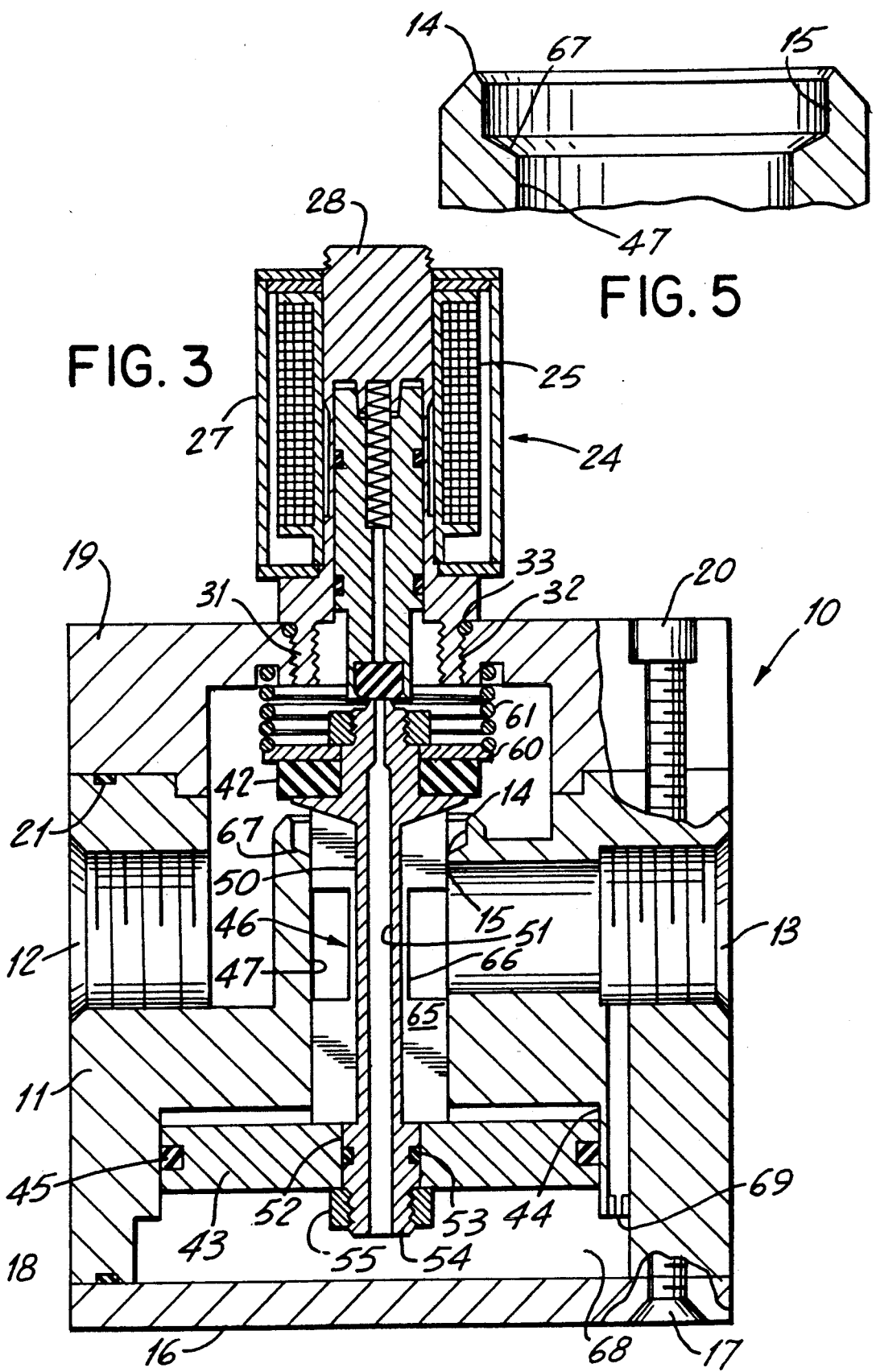
FIG. 3 is a view similar to FIG. 1 showing the solenoid energized and the main valve open.
FIG. 5 is a fragmentary view, on an enlarged scale, of the main valve seat and orifice.

The position of armature 36, at any moment, is determined by the amount of current applied to solenoid coil 25. For example, if the pulsed width modulation voltage is turned on 50% of the time and off 50% of the time, the current flowing through the coil will be 50% of maximum. As a result, armature 36 will rise through ½ its maximum stroke between its position when the valve is closed (FIG. 1) and its position when its upper face engages the lower face of plug nut 28 (FIG. 3). Consequently, unit 42, 43, and 46 will be permitted to rise through just 50% of its maximum rise, and hence valve member 42 will be spaced from valve seat 14 about ½ of the maximum possible spacing. Thus, approximately ½ the rate of maximum flow through the valve will be permitted between inlet port 12 and outlet port 13. If the voltage is on 75% of the time and off 25% of the time, armature 36 will rise through ¾ of its maximum stroke, and as a result the main valve will open so as to permit approximately 75% of maximum flow through the valve. It will be appreciated, therefore, that the rate of flow through the main valve is proportional to the amount of current applied to the solenoid coil 25.

As pointed out above, the valve responds most effectively when a pulsed DC source is applied to coil 25, as compared to simply varying the value of a steady DC current. Pulsing the current imparts a dither to armature 36 which permits greater control of the position of the armature in response to the amount of current applied to coil 25.

Moreover, it has been found that optimum performance is obtained when the frequency of the DC pulses is matched to the size of the valve being controlled. More specifically, the pulse width modulation frequency should be altered in inverse relation to the size of the valve orifice 15, i.e., the larger the orifice the lower the frequency. For example, optimum performance has been obtained with a valve having a one-quarter inch orifice using a pulse width modulation frequency of 95 Hz.; with valves having one-half inch and three-quarter inch orifices, frequencies of 75 Hz. and 33 Hz., respectively, have yielded optimum performance.

Deviating from these optimal frequencies can result in an increase in the hysteresis of the valve, i.e., in some cases different flow rates are experienced, at the same current value, depending upon whether the current was increased to reach that value or decreased to reach that value. In contrast, when the optimal frequency for a particular size valve is employed, the flow rates through the valve, when different currents are applied to the coil, are substantially the same for each applied current value regardless of whether the applied current was increased or decreased to reach the particular applied current value.

If the valve is used in an upright condition, as shown in the drawings, spring 61 could be eliminated since the force of gravity will perform the function of this spring. However, the presence of the spring permits the valve to be used in any orientation.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A proportional flow valve comprising:
   a valve body including an inlet port, an outlet port, and an orifice between the ports surrounded by a main valve seat,
   a main valve member movable into and out of engagement with the main valve seat to close and open the valve, respectively, the pressure of fluid from the inlet port urging the valve member into engagement with the valve seat when the valve is closed,
   a pressure member movable with respect to the main valve seat,
   means for rigidly interconnecting the pressure member and the valve member so that they move together as a unit,
   passageway means, within the interconnecting means, through which high pressure fluid from the inlet port can flow to the pressure member so as to create a force in opposition to the force created by the high pressure fluid on the valve member,
   the area of the pressure member subjected to fluid pressure from the inlet port being substantially larger than the area of the main valve member subjected to the fluid pressure from the inlet port, so that when the pressure member is pressurized a net force results on the pressure member and valve member unit which moves the main valve member away from the main valve seat to open the valve,
   a pilot valve member located in the path of movement of the passageway means for controlling the flow of fluid from the inlet port through the passageway means, and
   a solenoid actuator for positioning the pilot valve member to determine the spacing of the main valve member from the main valve set when the passageway is closed, the position of the pilot valve member, and hence the spacing of the main valve member from the main valve seat, being proportional to the amount of current applied to the actuator,
   the valve being devoid of any mechanical interconnection between the main valve member and the solenoid actuator, so that movement of the solenoid actuator is not directly transmitted to the main valve member.

2. A valve as defined in claim 1 including means for relieving the fluid pressure from the inlet port which is applied to the pressure member.

3. A valve as defined in claim 2 including a chamber on the side of the pressure member opposite the side facing the main valve member, the fluid from the inlet port flowing through the passageway means to the chamber when the pilot valve is open, and means for constantly bleeding fluid from the chamber to the outlet port.

4. A valve as defined in claim 3 wherein the pressure member is a piston slidable within the valve body, the diameter of the piston being larger than that of the main valve member.

5. A valve as defined in claim 1 wherein the pressure member is a piston slidable within the valve body, the diameter of the piston being larger than that of the main valve member.

6. A valve as defined in claim 1 wherein the end of the passageway means closer to the main valve member terminates in a pilot valve seat cooperable with the pilot valve member.

7. A valve as defined in claim 6 wherein the solenoid actuator includes a moveable armature, the pilot valve member being carried by the armature.

8. A valve as defined in claim 1 wherein the valve orifice is reduced in diameter at a point spaced downstream from the main valve seat.

9. A valve as defined in claim 1 wherein the interconnecting means includes a generally tubular body having a plurality of radially extending vanes, and the valve body has a bore for slidably accommodating the vanes, so as to guide the movement of the interconnecting means while permitting fluid flow through the bore.

10. A valve as defined in claim 9 wherein each of the vanes has a cut-out to permit fluid flow through the vane, thereby minimizing the tendency of the flowing fluid to rotate the interconnecting means.

* * * * *